July 15, 1969

R. J. NELSON ETAL 3,455,397

HYDRAULIC CONTROL SYSTEM FOR AGRICULTURAL
TRACTOR ROCKSHAFTS

Filed Dec. 7, 1966

INVENTORS
ROGER J. NELSON
RICHARD TREICHEL

INVENTORS
ROGER J. NELSON
RICHARD TREICHEL

United States Patent Office 3,455,397
Patented July 15, 1969

3,455,397
HYDRAULIC CONTROL SYSTEM FOR AGRICULTURAL TRACTOR ROCKSHAFTS
Roger J. Nelson and Richard Treichel, Cedar Falls, Iowa, assignors to Deere & Company, Moline, Ill., a corporation of Delaware
Filed Dec. 7, 1966, Ser. No. 599,834
Int. Cl. A01b 63/112
U.S. Cl. 172—9    4 Claims

ABSTRACT OF THE DISCLOSURE

A load and depth type hitch and control system for connecting an agricultural implement to a tractor, the position of the implement being responsive to a rockshaft controlled by a hydraulic system including a hydraulic cylinder and a pair of poppet-type control valves actuated by a servo-type system to automatically position the implement to provide a preselected implement position and/or load.

Background of the invention

Load and depth type hitches and control systems of the general character described above are well-known in the art. Such systems conventionally include a transverse rockshaft mounted on a rearward portion of the tractor and having a pair of parallel lift arms respectively connected to a pair of lift links, which vertically position the lower draft links of a three-point hitch and the implement mounted thereon. Such systems are conventionally selectively adjustable to provide position or depth control only, wherein the position of the rockshaft and consequently the vertical position of the implement is directly responsive to the position of an operator-actuated control lever, load control only, wherein the vertical position of the implement is automatically adjusted to maintain a predetermined draft load on the draft links, the predetermined load being selectively adjustable by the operator, or a combination of load and depth control, wherein the implement position is partly responsive to both the preselected load and implement position. The rockshaft is conventionally positioned by a hydraulic cylinder, the pressurization or exhaust of which respectively causes a raising or lowering of the draft links and is controlled by a valve means, actuated by a servo mechanism, which coordinates the position and/or load of the implement to the preselected position and/or load established by the control lever. The position of the rockshaft and the load on the draft links is conventionally sensed by mechanical means and the signal is mechanically transmitted to the valve means through the servo mechanism, the draft load or a portion thereof generally being transmitted through some type of spring, the deflection of which is transmitted to the servo mechanism.

Heretofore, it has been found desirable to utilize poppet-type valves in the control valve means, since spool-type valves are difficult to seal against leakage through the valve, such leakage permitting an undesirable settling of the implement under load or creeping upward of the implement due to pump pressure reaching the cylinder. In addition, spool-type valves require some degree of overlap in the closed position, so that a substantial amount of valve movement is required before the valve opens. This of course reduces the sensitivity of the system. While poppet-type valves do not have the above disadvantages, they require a greater force for their actuation, since to open such a valve, it is nec ssary to work against the spring which normally biases the valve toward a closed position, and the force exerted by the fluid pressure on the pressurized side of the valve. Of course, once the valve is opened, the force due to the pressure differential disappears, causing an abrupt change of force in the valve. The increased valve operating force creates a hysteresis loss in the servo system, the resulting loss of sensitivity being undesirable, especially when relatively light draft implements, such as landscape tools, are being operated under load control. It has also been found that poppet-type valves in such systems were subject to instability or oscillations, commonly referred to as "valve chatter," the instability primarily being the result of the abrupt changes in force when opening the poppet-type valves and oscillations or vibrations in the load sensing and servo mechanisms.

Summary

According to the present invention, the rockshaft control system is provided with improved control valves which eliminate the disadvantage of the above-described poppet-type valves while retaining their advantages, specifically the positive sealing characteristics and small degree of valve travel for a given flow rate. More specifically, the present invention resides in the provision of pressure balanced poppet-valves, wherein the hydraulic forces on the valve are substantially balanced so that the valve-actuating force need only be sufficient to work against the valve spring. Another feature of the present invention resides in the provision of dampening means within the valve to retard the oscillations inherent in the valve and in the system to an acceptable level, thereby eliminating the valve chatter.

The above and other features inherent in the invention will become apparent from the following detailed description and accompanying drawings.

Description of the preferred embodiment

Figure 1:
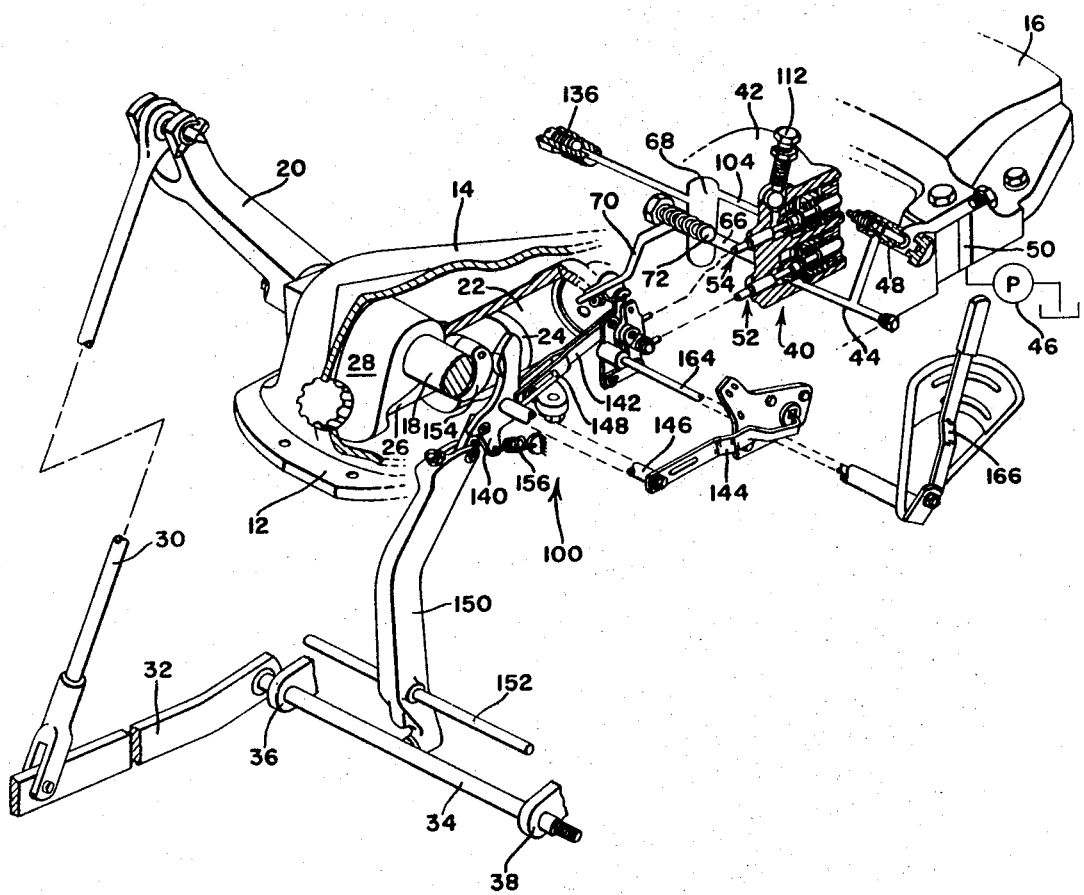
FIG. 1 is a perspective, partially exploded and schematic, view of a rockshaft control system embodying the present invention, with portions of the mechanism shown in section and other portions broken away to more clearly disclose the invention.

A typical agricultural tractor includes a fore-and-aft body with laterally extending axles, the above construction being conventional and not being illustrated in the drawings. Mounted on the rearward portion of the tractor is a hitch and control system therefor, indicated in its entirety by the numeral 10, most of the basic components of which are contained in a housing 12 including a downwardly and forwardly inclined top wall 14 and a forward housing portion 16, which is shown separated from the remainder of the housing in FIG. 1 to more clearly illustrate the components therein, most of the housing being omitted or broken away in FIG. 1 for the purpose of clarity. The housing 12 is conventionally mounted on top of the rear portion of the tractor body in a sealed relationship, and forms a hydraulic reservoir for the control system. A transverse rockshaft 18 is journaled in the housing 12 and extends laterally therefrom. A pair of lift arms 20 is attached to the opposite ends of the rockshaft, only the left-hand lift arm being shown in FIG. 1, the right-hand portion of the rockshaft 18 being similar to the left-hand portion. Mounted within the housing 12 is a fore-and-aft hydraulic cylinder 22, within which a piston 24 moves in response to hydraulic pressure, the piston 24 being connected by a rod 26 to a crank arm 28 attached to the rockshaft, so that the rockshaft rotates in response to movement of the piston.

Each lift arm 20 is connected by a lift link 30 to a generally fore-and-aft lower draft link 32 having its forward end pivotally connected to a lower portion of the tractor body by means of an elongated, transverse, resilient shaft 34, the lower draft links 32 being connected at the opposite ends of the shaft, which in turn is journaled on the tractor body at two points 36 and 38 adjacent to and interiorly of the opposite draft links 32. For purpose of clarity, only the left-hand lift link and lower draft link are illustrated. When the rearward ends of the draft links 32 are connected to the trailing implement, the draft force transmitted through the lower draft links 32 will pull the opposite ends of the shaft 34 rearwardly, causing the central portion of the shaft 34 between the points 36 and 38 to deflect forwardly, the amount of deflection being proportional to the draft force. The lower draft links 32, of course, comprise only two elements of a conventional three-point hitch, the central top link which is also connected to the trailing implement being omitted, such hitches and sensing of the draft load through a resilient shaft, such as the shaft 34, being well-known in the art.

Pressurization of the hydraulic cylinder 22 rotates the rockshaft 18 in a clockwise direction as viewed from the right side of the tractor, thereby raising the lower draft links 32 and the implement mounted thereon, while exhaust of the hydraulic cylinder permits the lowering of the draft links and the implement mounted thereon, the pressurization or exhaust of the cylinder being controlled by hydraulic control valve means, indicated in its entirety by the numeral 40.

Figure 2:
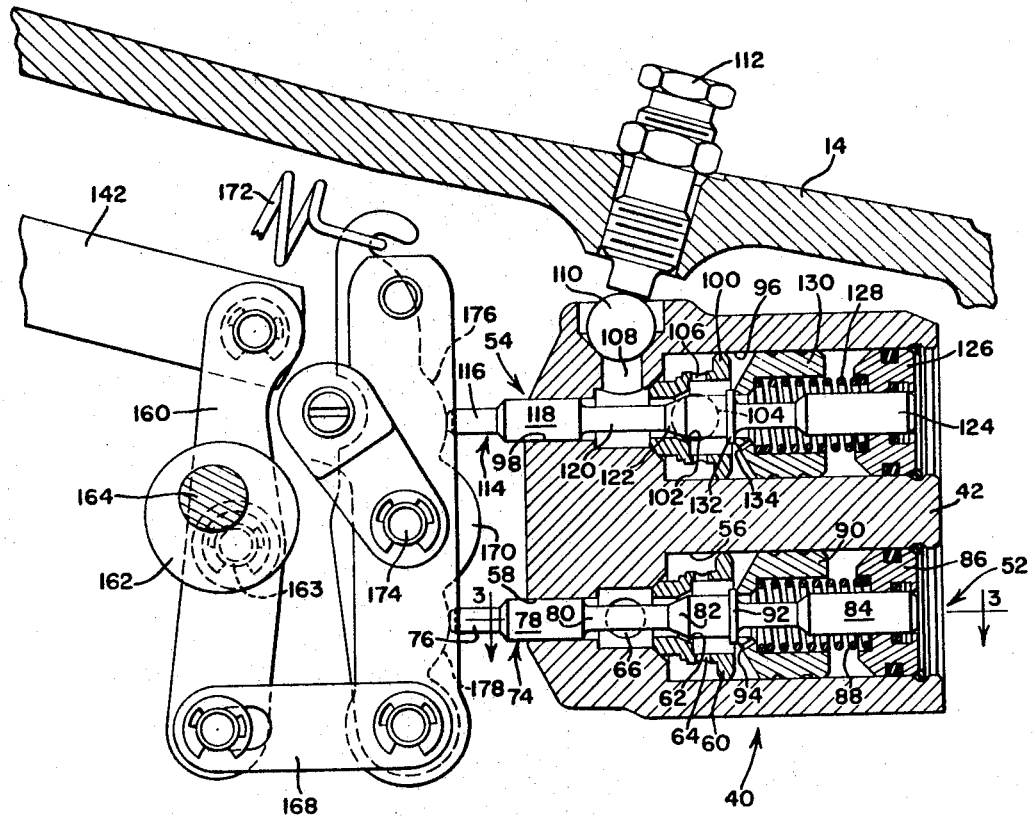
FIG. 2 is an enlarged section through the center line of the control valves and showing a portion of the valve-actuating servo mechanism.
Figure 3:
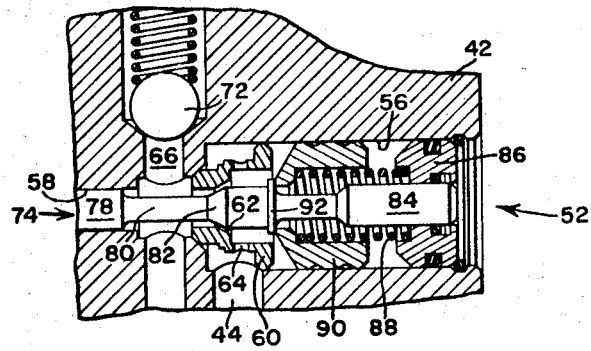
FIG. 3 is a section through the lower control valve as viewed along the line 3—3 of FIG. 2.

The control valve means 40, the details of which are best seen in FIGS. 2 and 3, includes a valve housing 42 mounted within the housing 12 forwardly of the cylinder 22. The housing has a high pressure inlet 44, connected to a source of fluid pressure 46, conventionally an engine-driven hydraulic pump, through a flow control valve 48 and a hydraulic line 50 through the forward housing portion 16. The control valve means 40 comprises a pair of substantially similar, axially parallel, vertically offset poppet-type valves 52 and 54, the lower valve 52 controlling the pressurization of the cylinder, while the upper valve 54 controls the exhaust of the cylinder. The lower or pressure control valve 52 has a larger or inlet bore 56, extending from the forward end of the valve body 42, and a smaller or outlet bore 58 coaxially connected thereto and extending from the rearward end of the body 42. An annular valve seat member 60 is coaxially mounted in the rearward end of the larger bore 56 and forms an annular tapered valve seat 62, having a 60° included angle in the preferred embodiment. The inlet line 44 is connected to the larger bore 56 forwardly of the valve seat 62 via a plurality of radial passages 64 through the valve seat member 60, while the smaller bore 58 is connected to an outlet passage 66 on the rearward side of the valve seat.

The passage 66 is connected to a chamber 68 in the valve body, and the chamber 68 in turn is connected to the hydraulic cylinder 22 via a conduit 70. A ball-type check valve 72 is mounted in the valve body at the juncture of the chamber 68 and the outlet passage 66 and permits the flow of fluid from the passage 66 to the chamber only.

An elongated valve member 74 coaxially extends through the valve bores and includes a rearward portion 76 projecting rearwardly from the valve body 42, a cylindrical portion 78, having the same diameter as the bore 58 and sealing the rearward end of the valve bore 58, a reduced diameter portion 80 opposite the outlet 66, a frustum-shaped valve head 82, which has an included angle of approximately 50° in the preferred embodiment and engages the seat 62 when the valve member 74 moves rearwardly to disconnect the inlet 44 from the outlet 66, and a cylindrical forward portion 84. The cylindrical portion 84 has approximately the same diameter as the valve head 82 at the point of engagement with the valve seat and is sealed by and axially slidable in an annular plug 86, which closes off the forward end of the larger valve bore 56. The valve member 74 is biased rearwardly toward a closed position by a valve spring 88 acting between the annular plug 86 and an annular damping piston 90, which engages a shoulder 92 rearwardly of the valve head 82. The damping piston 90 seals the valve bore 56 between the valve seat and the annular plug except for a small orifice 94 through the damping piston, the orifice having a diameter of .031 inch in the preferred embodiment.

Except for its connections, the upper or exhaust control valve 54 is identical to the pressure control valve 52, the valve again including coaxially connected bores 96 and 98 with a valve seat member 100 coaxially mounted in the bottom of the larger bore 96, again forming an annular tapered valve seat 102. The larger valve bore 96 is connected to an inlet passage 104, which in turn is connected to the chamber 68 in the valve body, the valve seat member 100 again having a plurality of radial passages to permit the flow of fluid from the inlet 104 to the valve seat. The smaller valve bore 98 is connected directly to the exterior of the valve body 42 by an outlet line 108, the fluid discharging into the interior of the housing 12 which forms a fluid reservoir. A ball-type throttle valve 110 is associated with the outlet line 108 to control the maximum flow rate through the line 108 and thereby control the rate of drop of the rockshaft and the implement supported thereby. The maximum clearance between the throttle valve 110 and its seat is adjustable via an adjusting screw 112 extending through the top wall 14 of the housing 12. An elongated valve member 114 extends through the bores 96 and 98 and includes a rearward portion 116, a cylindrical portion 118 having the same diameter as and mounted in the smaller bore 98, a reduced diameter portion opposite the outlet 108, a valve head portion 122, seatable on the valve seat 102, and a cylindrical forward end portion 124, which is mounted in and sealed by an annular plug 126 at the forward end of the bore 96 and has approximately the same diameter as the valve head at the point where the valve head engages the valve seat. The valve member 114 is biased rearwardly toward its closed position by a valve spring 128 acting between the plug 126 and an annular damping piston 130, which engages a shoulder 132 on the valve member 114 and disconnects the space between the plug and the damping piston from the remainder of the valve except for a small orifice 134. A relief valve 136 establishes the maximum pressure in the chamber 68 and consequently the cylinder 22.

The valves 52 and 54 are mechanically actuated through a servo-type mechanism which renders the valves responsive to the position of the draft links only, the load on the draft links only, or a combination of the two, mechanisms of this type being well-known in the art and commonly referred to as "load and depth control." The mechanism includes a cam follower 140, the forward surface of which is engaged by a fore-and-aft link 142, the point of engagement between the link and the cam follower being controlled by a selector lever 144 mounted on a transverse shaft 146, the rotation of which, via the lever 144, swings a rod 148, which engages the rearward portion of the link 142, to adjust the position of the rearward end of the link on the cam follower. When the selector lever 144 is moved to its lower position, the link 142 is moved to its lowermost position against the cam follower, as shown in FIG. 1. In this position, the link 142 is moved solely by movement of the shaft 34 via a load control arm, which is pivotally mounted to the tractor body by a transverse pivot 152, the lower end of the load control arm 150 engaging the central portion of the shaft 34 and the upper end of the load control arm being connected to the lower end of the cam follower 140.

The upper end of the cam follower 140 rides against a cam 154 mounted on the rockshaft 118. As the rockshaft raises (rotates in a clockwise direction as viewed in FIG. 1), the cam 154 moves the upper end of the cam follower 140 forwardly, the rock-shaft being shown in its raised position in FIG. 1. However, when the link 142 is in its lower position, as shown in FIG. 1, the movement of the upper end of the cam follower does not affect the link 142. Conversely, if the selector lever is raised to its uppermost position, so that the link 142 engages the upper end of the cam follower 140, the link 142 is moved solely by the upper end of the cam follower, which is responsive to the position of the rockshaft only. The cam follower 140 is biased against the cam 154 by a spring 156 acting between the cam follower and the housing 12.

The forward end of the link 142 is pivotally connected to the upper end of a servo arm 160, which is mounted intermediate its ends on a transverse pivot 163 carried by a pivot block 162, attached to a transverse shaft 164 parallel to and offset from the servo arm pivot 163, the eccentric relationship between the shaft 164 and the servo arm pivot 163 causing a fore-and-aft shifting of the servo arm pivot 163 in response to rotation of the shaft 164. The shaft 164 is connected to and rotated by a rockshaft control lever 166, which, like the selector lever 144, is conventionally accessible to and actuated by the vehicle operator. The lower end of the servo arm 160 is pivotally connected to a fore-and-aft link 168, which, in turn, is pivotally connected to the lower end of a valve-actuating member 170, the upper end of which is biased rearwardly by a spring 172 attached to the housing 12. The valve-actuating member 170 rocks about a transverse pivot 174 intermediate its ends, the pivot 174 being parallel to the three servo arm pivots and the lower actuating member pivot, so that fore-and-aft movement of the link 142 causes the member 170 to rock about its pivot. As best seen in FIG. 2, forward movement of the link 142 causes the member 170 to rock in a clockwise direction about the pivot 174, so that a cam surface 176 on the member 170 engages the rearward portion 116 of the valve 114, causing the valve to open against the bias of the spring 128. Conversely, a rearward movement of the link 142 causes the member 170 to rock in a counterclockwise direction about the pivot 174, so that a lower cam surface 178 engages the rearward portion 76 of the valve 74, causing the valve to open against the bias of the spring 88.

In operation, if the operator desires that the implement be positioned to provide a constant draft load, he sets the selector lever 144 in its lower position, as shown in FIG. 1, whereby the link 142 moves only in response to the deflection of the load control shaft 34. The amount of load is predetermined by adjustment of the rockshaft control lever 166, the further forward and downward the lever is set, the greater the predetermined load. Forward movement of the rockshaft control lever increases the predetermined load since it rocks the shaft 164 in a clockwise direction, as seen in FIG. 2, the clockwise rocking of the shaft 164 moving the central servo arm pivot 163 rearwardly, and since the upper end of the servo arm 160 is fixed by the link 142, a rearward movement of the pivot 163 also moves the lower end of the servo arm rearwardly, causing the clockwise rocking of the valve-actuating member 170, which opens the upper valve 54 and permits discharge of oil from the cylinder 22, the weight of the implement forcing the oil from the cylinder 22. As the implement lowers, the draft load on the links 32 increases, causing a greater deflection of the central portion of the load control shaft, which deflection is transmitted to the link 142 via the cam follower 140 and arm 150, causing the link 142 to move rearwardly. The rearward movement of the link 142 moves the upper end of the servo arm 160 rearwardly, which, of course, rocks the valve-actuating member 170 in a counterclockwise direction. When the load reaches a point where it corresponds to the load selected at the rockshaft control lever, the movement of the central portion of the servo arm as established by the control lever 166 is balanced by the movement of the upper end of the servo arm as established by the deflection of the load control shaft 34, so that the valve-actuating member 170 returns to its neutral position, wherein both the valves 52 and 54 are closed, as shown in FIG. 2. An increase in the load, such as caused by different soil conditions, moves the link 142 rearwardly, and since the pivot 163 is fixed by the control lever 166, the valve-actuating member 170 will rock in a counterclockwise direction, opening the lower valve 52 to cause a pressurization of the cylinder 22, whereby the rockshaft will raise the implement, decreasing the draft load until the load reaches the selected value.

For depth control, the selector lever is moved upwardly to shift the link 142 upwardly so that it responds only to movement of the rockshaft 18 via the cam 154 and cam follower 140. In this position, the implement raises and lowers directly in response to movement of the control lever 166, regardless of the load on the draft links. For example, to raise the implement, the lever 166 is moved rearwardly, causing a counterclockwise movement of the shaft 164, which in turn moves the pivot 163 and the lower end of the servo arm 160 forwardly, thereby causing the valve-actuating member 170 to open the lower valve 52. The valve remains open and ports fluid to the cylinder 22, causing the rockshaft to rotate, until the rockshaft cam 154 moves the link 142 a sufficient distance to counterbalance the change in position of the servo arm established by the rockshaft control lever 166.

For combined load and depth control, the selector lever 144 is moved to a position intermdeiate its previously described position, so that the link 142 engages the center part of the cam follower 140, whereby the link 142 is partly responsive to movement of both ends of the cam follower as respectively effected by the position of the rockshaft and the deflection of the load control shaft 34.

The valves 52 and 54 are constantly pressurized on the upstream or inlet side of their valve seats, the inlet of the lower valve 52 being pressurized by the fluid pressure source 46, while the upper valve inlet is under the working pressure of the fluid in the cylinder 22 and in the chamber 68. However, the configuration of the valve members 74 and 114 is such that this pressure creates no substantial axial force on the valve members 74 and 114, so that the valve-actuating mechanism need only work against the valve springs 88 and 128 to open the valves. Thus, there is no abrupt change in forces in the valve after it is open, reducing valve instability and poor operating characteristics caused thereby. The small actuating force necessary to crack the valves is especially desirable when the system is being operated in load control since the valve-actuating force opposes the signal produced by the shaft 34. Also in load control, the system is subject to vibration, since the sensing shaft 34 is essentially a spring. In addition, the valve-actuating mechanism includes springs 156 and 172, the vibration in the actuating mechanism being transmitted to the valves 52 and 54. The damping pistons 130 and 90, however, retard the rate of response of the valves, movement of the valves being limited by the amount of fluid passable through the orifices 94 and 134, so that the valve itself does not vibrate or chatter during operation. However, the orifices are sufficiently large so that the response in the valve is not unduly affected, it being found that the previously described orifices will dampen out vibrations only in excess of eight cycles per second.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a tractor having a fore-and-aft body, a draft means connectible to an associated implement, a servo-type control system including a valve-actuating element responsive to both a sensing means associated with the draft means and an operator-actuated control, a power means for adjusting the draft means relative to the tractor body and activated by a hydraulic cylinder, and a source of fluid pressure and an associated reservoir, the combination therewith of improved control valve means actuated by the control system for supplying fluid pressure to or exhausting the hydraulic cylinder and comprising: a valve body means, a first valve bore in the body means having a cylindrical inlet portion open at one end and connected to the fluid pressure source, an outlet portion connected to the hydraulic cylinder, and an annular valve seat therebetween, and a second valve bore in the body means having a cylindrical inlet portion open at one end and connected to the hydraulic cylinder, an outlet portion connected to the reservoir, and an annular valve seat therebetween, an annular plug coaxially disposed in each inlet portion between the open end and the valve seat, an elongated valve member coaxially mounted in each valve bore, each valve member having a valve head coaxially seatable on the valve seat to disconnect the inlet and outlet portions and a cylindrical portion coaxially shiftable through the respective annular plug and having substantially the same diameter as the valve head at its point of engagement with the valve seat, the annular plug and valve member conjunctively closing the open end of the inlet portion of the bore, and a spring means acting on the respective valve members and biasing them toward their closed positions, each valve member being actuatable by the valve-actuating element into an open condition.

2. The invention defined in claim 1 at least one of said control valves includes an annular damping piston mounted in the inlet portion of the valve bore between the valve seat and the annular plug and sealable against the valve bore and the valve member to isolate the inlet portion of the valve bore on opposite sides of the piston, the damping piston including a relatively small orifice connecting its opposite sides to control the rate of fluid flow between the opposite sides of the piston, restricting the rate of axial movement of the piston and the valve member connected thereto.

3. A hydraulic control valve comprising: a valve body; a valve bore in the body, including first and second portions; an inlet port connected to the first portion; an outlet port connected to the second portion; an annular valve seat between the first and second bore portions; an annular plug mounted in the end of the first bore portion opposite the valve seat; an elongated valve member coaxially shiftable in the first bore portion and having a valve head seatable on the valve seat to disconnect the inlet and outlet ports and a cylindrical portion coaxially slidable through the annular plug and having substantially the same diameter as the valve head at the point of engagement with the valve seat, the annular plug and said cylindrical portion conjunctively sealing the end of the first bore portion; a spring means acting on the valve member and biasing it toward a closed position; a valve-actuating means operatively connected to the valve member for shifting the valve head away from the valve seat to connect the inlet and outlet ports; an annular piston coaxially mounted on and shiftable with the valve member within the first bore portion between the annular plug and the inlet port, and isolating the bore on opposite sides of the piston; and orifice means through the piston for controlling the rate of fluid flow between the opposite sides of the piston as the piston moves with the valve member, limiting the rate of movement of the valve member from its closed to its open position.

4. The invention defined in claim 3 wherein the valve seat and the valve head are frustum shaped with the larger diameter toward the first bore portion, the valve seat having a greater included angle than the valve head.

References Cited

UNITED STATES PATENTS 2,361,685  10/1944  Grise _____ 251—282 X
2,921,638  1/1960   Du Shane _____ 172—9

ANTONIO F. GUIDA, Primary Examiner

WALTER J. CONLON, Assistant Examiner